(12) United States Patent
Vidaic

(10) Patent No.: US 12,172,759 B2
(45) Date of Patent: Dec. 24, 2024

(54) AIRCRAFT ANTI-ICING PROTECTION SYSTEM USING BLOWN HOT AIR WITH REDUCED ENERGY PENALTY

(71) Applicant: SONACA S.A., Gosselies (BE)

(72) Inventor: Jonas Vidaic, Mignault (BE)

(73) Assignee: SONACA S.A., Gosselies (BE)

( * ) Notice: Subject to any disclaimer, the term of this patent is extended or adjusted under 35 U.S.C. 154(b) by 9 days.

(21) Appl. No.: 18/259,127

(22) PCT Filed: Dec. 20, 2021

(86) PCT No.: PCT/EP2021/086886
§ 371 (c)(1),
(2) Date: Jun. 23, 2023

(87) PCT Pub. No.: WO2022/136318
PCT Pub. Date: Jun. 30, 2022

(65) Prior Publication Data
US 2024/0051668 A1    Feb. 15, 2024

(30) Foreign Application Priority Data

Dec. 24, 2020 (BE) .................................. 2020/5980

(51) Int. Cl.
*B64D 15/04* (2006.01)
(52) U.S. Cl.
CPC .................................... *B64D 15/04* (2013.01)
(58) Field of Classification Search
CPC ................................ B64D 15/04; F02C 7/047
See application file for complete search history.

(56) References Cited

U.S. PATENT DOCUMENTS 6,267,328 B1    7/2001    Vest

FOREIGN PATENT DOCUMENTS

| EP | 1116656 A1 | 7/2001 |
| EP | 1739013 A1 | 1/2007 |
| EP | 3733523 A1 | 11/2020 |

OTHER PUBLICATIONS

International Search Report for Application No. PCT/EP2021/086886 dated Mar. 21, 2022.
Written Opinion for PCT/EP2021/086886 dated Mar. 21, 2022.

*Primary Examiner* — Nicholas McFall
(74) *Attorney, Agent, or Firm* — Pearne & Gordon LLP

(57) ABSTRACT

A system for protecting a surface of an aircraft against icing by blasting a quantity of warming air against the surface in order to warm it, this quantity of warming air needing to be at a permissible temperature to which the surface can be exposed without compromising the mechanical integrity thereof. The system includes: structures for bleeding a quantity of bleed air from a pneumatic hot source and for conveying this quantity of bleed air, the quantity of bleed air being at a temperature higher than the permissible temperature; structures for capturing and conveying a quantity of collected air corresponding to a portion of the quantity of warming air after it has been blasted against the surface that is to be warmed, this quantity of collected air being at a temperature lower than the permissible temperature; regulating and mixing structures which regulate the quantities of collected and bleed air in order, by mixing these two quantities, to form the quantity of warming air at the permissible temperature; structures for conveying the quantity of warming air towards and blasting it against the aircraft surface that is to be warmed.

8 Claims, 3 Drawing Sheets

AIRCRAFT ANTI-ICING PROTECTION SYSTEM USING BLOWN HOT AIR WITH REDUCED ENERGY PENALTY

This is the National Stage of PCT international application PCT/EP2021/086886, filed on Dec. 20, 2021 entitled "AIRCRAFT ANTI-ICING PROTECTION SYSTEM USING BLOWN HOT AIR WITH REDUCED ENERGY PENALTY", which claims the priority of Belgium Patent Application No. 2020/5980 filed Dec. 24, 2020, both of which are incorporated herein by reference in their entirety.

TECHNICAL FIELD

The present invention relates to an anti-icing protection system that sets out to avoid the formation of ice or to eliminate it on an aircraft surface, and more specifically to a system for protecting a surface against frost by spraying hot air onto said surface.

Prior Art

Icing, meaning the adhesion of frozen water droplets, constitutes a dangerous meteorological phenomenon in the aeronautical field. Ice may form on the lifting surfaces of an aircraft and thus impair their aerodynamic properties: reduction in lift, increase in drag. In addition, the formation of ice may have an impact on the reliability of the measuring apparatus, and limit or even paralyse the actuation of the variable-geometry devices such as the movable control surfaces. These aspects may lead to a loss of manoeuvrability, resulting in the most critical case to crashing of the aircraft.

Combating the formation of ice is therefore essential for guaranteeing performances and the safety of passengers. In this regard, various devices such as heating elements, inflatable air chambers activated so as to break up the ice, or hot-air spray systems are used.

Such hot-air spray systems, mainly adopted by aircraft constructors in the case of de-icing of leading-edge high-lift flaps, consist in taking hot air at the turbine engines equipping the aircraft, and spraying it onto the flaps while conveying it in the wing.

With reference to the accompanying FIGS. 1 and 2, taking a quantity Q of hot air at one or more compressor stages of the turbine engine 1, and transporting it along a flap 2 through a perforated duct 3 is known. The hot air is discharged from said duct 3 through perforations to an internal surface delimiting the flaps 2. The internal surface thus heated prevents the incident droplets from solidifying on an opposite external surface, or makes it possible to evaporate the ice already formed on this surface. Once sprayed onto the internal surface, the hot air conventionally follows a purging path within the flaps in order to be entirely discharged into the external environment, as shown by the arrows on FIG. 2. A valve 4 is in particular provided for allowing or blocking the taking of air F as required.

One of the difficulties associated with taking air at the turbine-engine compressors lies in the need to reduce the temperature of the air taken, denoted $T_{eng}$, to an acceptable level $T_{req}$ to guarantee the mechanical strength of the flaps, namely in particular to avoid degradation of the mechanical properties thereof following exposure to high temperatures. According to a known design, this function is provided by a heat exchanger 7, disposed along a portion conveying hot air to the flap 2.

In practice, this heat exchanger 7 is designed so that the air taken, the temperature $T_{eng}$ of which at the point of taking on the turbine engine is around 400° C., has a temperature $T_{req}$ at the outlet of the heat exchanger 7 equal to approximately 200° C. In this regard, it is understood that half of the calorific energy taken from the turbine engine is lost to make the quantity Q of air taken usable. In addition, it is observed that the air, and the moment that it is discharged into the atmosphere, namely after having been sprayed against the flap surface to be heated, has a residual temperature, denoted $T_{exh}$, of the order of 60°. As a result, only approximately one third of the available total calorific energy of the air taken is used.

Since taking air at the turbine-engine compressors does not contribute to producing energy, in limiting the mechanical work of the turbines, and since a dissipation of energy is furthermore made necessary for making this taking of air usable, it is understood that such a hot-air de-icing/anti-icing solution could be improved.

The aim of the invention is therefore to propose a hot-air system for protecting against ice that limits the energy penalties related to the operation thereof.

DESCRIPTION OF THE INVENTION

For this purpose, the object of the invention is a system for protecting a surface of an aircraft against ice by spraying a quantity of heating air against said surface to heat it, this quantity of heating air requiring to have a temperature both higher than a threshold value for which the function of protection against frost is provided, and below a maximum acceptable value for the materials constituting the surface, this system comprising:
  means for taking a quantity of taken air at a pneumatic hot source and conveying this quantity of taken air, the quantity of taken air having a temperature higher than the acceptable temperature;
  means for capturing and conveying a quantity of collected air corresponding to a portion of the quantity of heating air after spraying of same against the surface to be heated, this quantity of collected air having a temperature below the acceptable temperature;
  regulation and mixing means that regulate the quantities of collected and taken air to form, by mixing these two quantities, the quantity of heating air at the acceptable temperature;
  means for conveying towards and spraying the quantity of heating air against the aircraft surface to be heated.

The invention thus makes it possible to respond at least partly to the requirements set out above by making it possible, by means of such a collected-air return loop, to limit the taking at the hot source that constitutes merely a component of the air sprayed onto the surface to be heated. Considering the pneumatic hot source and the surface to be heated as designating respectively a turbine-engine compressor and a leading-edge flap with regard to the prior art identified, with reference to FIGS. 1 a 2, it is understood that the system according to the invention makes it possible:
  to limit the energy penalties of the turbine engine in that the air passing through the gas generator thereof is in a greater quantity compared with the use of a hot-air de-icing/anti-icing system the sprayed air of which comes essentially from taking from the compressor;
  to dispense with the need to have recourse to a heat exchanger aimed at cooling the air taken from the compressor to obtain an acceptable temperature for the materials constituting the flap, given that the action of mixing the taken quantity with the collected quantity fulfils this function.

The system also relates to a system for protecting a surface of an aircraft thus defined against frost, this aircraft being driven by means of at least one turbine engine comprising a compressor stage that corresponds to the pneumatic hot source, wherein the means for taking and conveying the quantity of taken air include a supply pipe that conveys the quantity of taken air.

The invention also relates to a system for protecting against ice thus defined, wherein the surface to be heated is a surface delimiting a leading-edge flap equipping a wing of the aircraft, wherein:
- the means for conveying to and spraying the quantity of heating air against the surface include an injection tube in which the quantity of heating air circulates, this injection tube extending within the flap facing the surface and comprising perforations through which the quantity of heating air is sprayed out of this injection tube against the surface; and
- the means for capturing and conveying the quantity of collected air include a capture tube.

The invention also relates to a system for protecting against frost thus defined, wherein:
- the surface to be heated is a surface delimiting a leading-edge flap equipping a wing of the aircraft;
- the leading-edge flap includes a first internal chamber, delimited by the delimitation surface, wherein the quantity of heating air circulates as means for conveying towards and spraying the quantity of heating air against the surface;
- the leading-edge flap includes a second internal chamber, as means for capturing and conveying the quantity of collected air.

The invention also relates to a system for protecting against frost thus defined, wherein in the capture tube extends within the flap and comprises perforations through which the quantity of collected air is admitted into this capture tube.

The invention also relates to a system for protecting against frost thus defined, wherein the mixing means include:
- a mixing chamber in which the quantities of collected and taken air are conveyed;
- a control valve that regulates the passage of the quantity of taken air in the supply pipe;
- a pump or a compressor that controls the quantity of collected air admitted into this capture tube.

The invention also relates to a system for protecting against ice thus defined, wherein the mixing means include a Venturi that delimits a throttling neck,
- a first end of the Venturi being in communication with the supply pipe to receive the taken quantity:
- the capture tube being in communication with a branch formed at the throttling neck to convey the collected quantity in the Venturi;
- a second end of the Venturi being in communication with the injection tube to supply it with a quantity of heating air.

The invention also relates to an aircraft comprising a system according to one of the preceding claims for protecting one of its surfaces against ice.

DETAILED DESCRIPTION OF PARTICULAR EMBODIMENTS

In the following description, an airflow will be characterised by its temperature T and its mass flow rate Q, the latter otherwise being referred to as 'quantity' for convenience.

Figure 1:
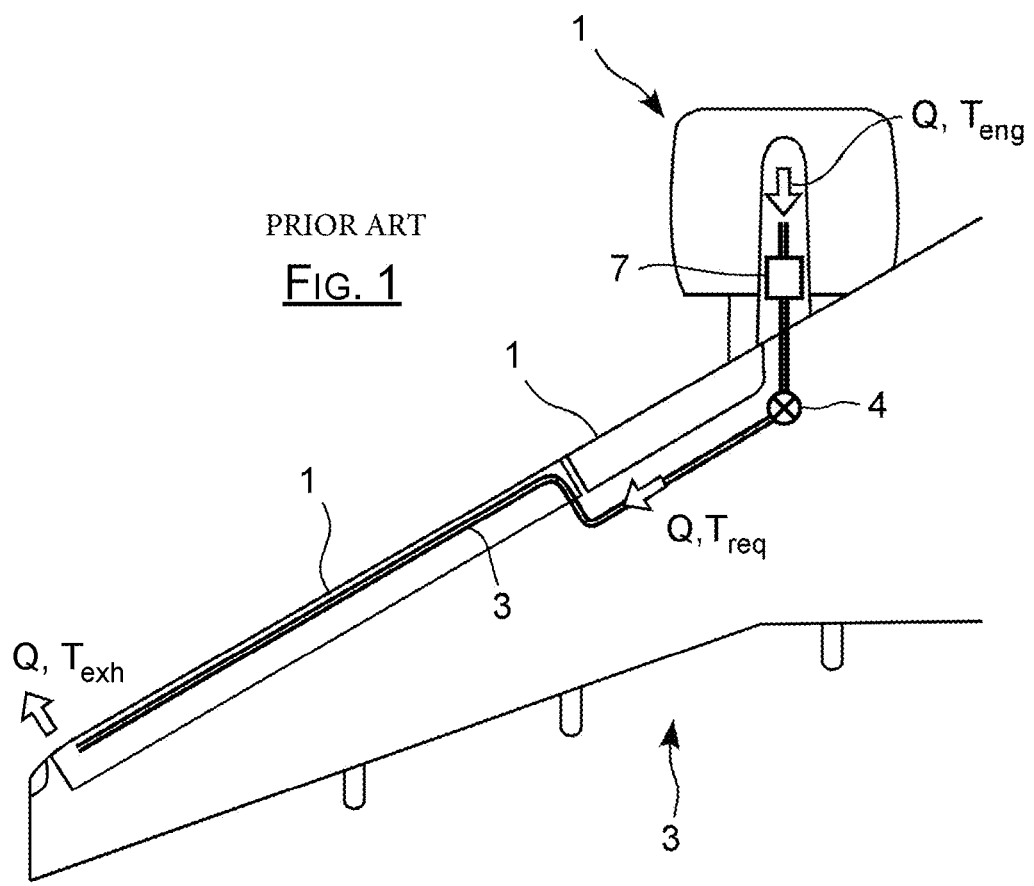
FIG. 1, already described, shows an elevation view of an aircraft wing that supports a turbine engine, provided with leading-edge flaps and a flap anti-icing system with heating-air spraying according to a known version of the prior art.
Figure 2:
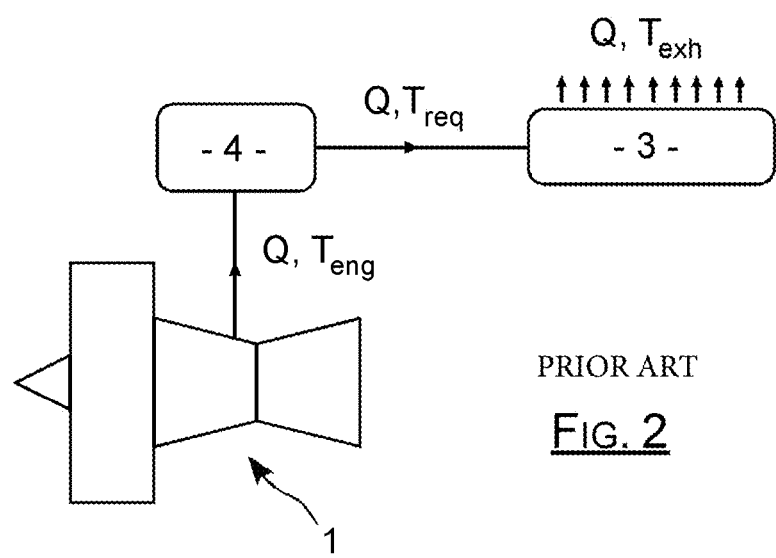
FIG. 2, already described, shows a state diagram that models the quantity and the temperature of the heating air during an anti-icing operation performed with the system of FIG. 1.
Figure 3:
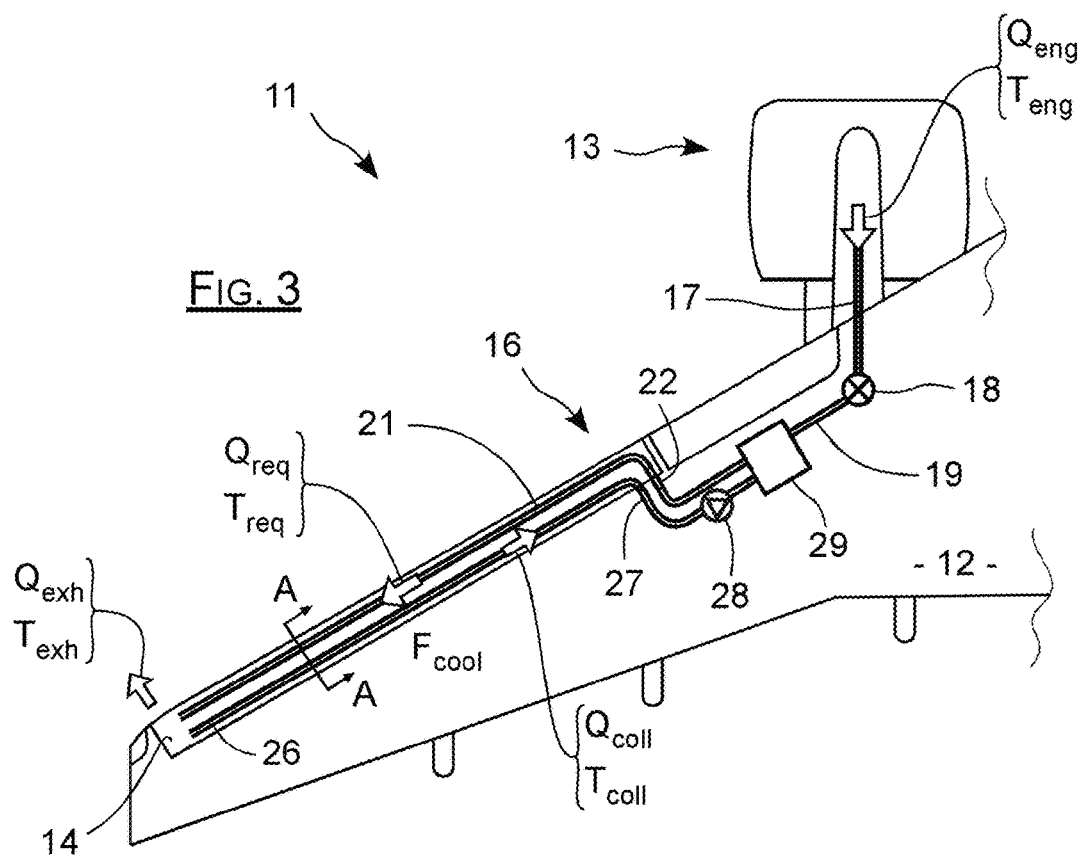
FIG. 3 shows an elevation view of an aircraft wing that supports a turbine engine, provided with leading-edge flaps and a flap anti-icing system with heating-air spraying according to a known version of the prior art.

With reference to FIG. 3, among the wing elements of an aircraft 11, there are two main wings 12, only one of which is shown. In this example, the aircraft 11 is propelled by turbine engines 13 supported by the wings 12. A turbine engine generically includes a gas generator through which an airflow travels. This gas generator includes a combustion chamber on either side of which compressor stages and turbine stages are arranged.

In a known manner, the main wings 12 are equipped with high-lift flaps 14 at the leading edge, namely the part of the wing that first encounters the relative wind. A flap, also commonly referred to as a "slat", is a movable device that moves from a position flush against the wing 12 and a separated position to reveal a slot in between itself and this wing in order to modify the flow parameters of the incident air flow.

In order to solve the problem of icing appearing on the slats 14, and having regard to the proximity thereof to the turbine engines supported by the corresponding wings 12, the aircraft 11 is equipped with anti-icing systems 16 by taking hot air at the turbine engines with a view to being sprayed on a slat wall to be heated.

In the example in FIG. 3, an anti-icing system 16 for a slat 14 of a wing 12 according to the invention includes a supply pipe 17 that connects a stage or a plurality of stages of a compressor of the turbine engine 13 equipping this wing, to a control valve 18. This valve 18 is designed to regulate the passage of a quantity $Q_{eng}$ of taking of air at the compressor of the turbine engine 13 to a supply pipe 19 that extends in the wing 12, in line with the supply pipe 17. This supply pipe 19 supplies an injection tube 21, also referred to as a "piccolo", that runs through an internal enclosure 20 of the slat 14 by means of a conduit 22 that connects them by passing through the leading edge of the wing 12. This conduit 22 is telescopic in nature, namely designed to be retractable/deployable while being formed by a first element and a second element that fit one in the other, so that the anti-icing system 16 does not interfere with the actuation of the slat 14.

Figure 4:
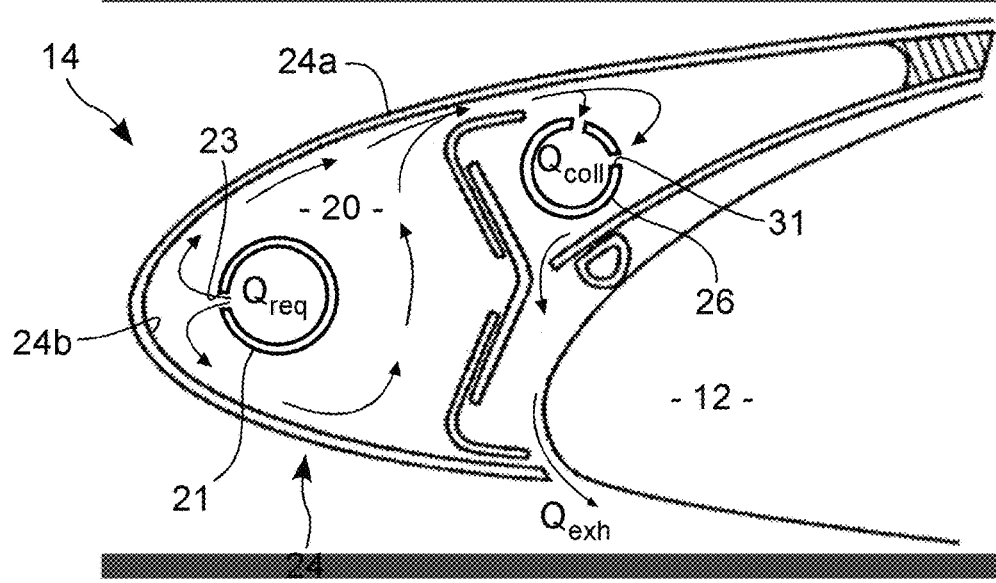
FIG. 4 is a sectional view along the line A-A of FIG. 3.

As can be seen in detail on FIG. 4, the injection tube 21 extends at isodistance from a wall 24 delimiting the internal chamber 20 of the slat, an external surface 24a of which is exposed to the external environment and therefore subject to icing. The injection tube 21 has perforations 23 oriented towards an internal surface 24b of the delimitation wall 24 directly opposite so that the flow of air circulating within it, denoted $Q_{req}$, is sprayed against this internal surface 24b to heat it. The external surface 24a that is opposite to the internal surface 24b is heated under the effect of a heat exchange by conduction. The quantity $Q_{req}$ sprayed against the delimitation wall 24 flows in particular along this wall forming a film.

The idea at the basis of the invention is to best use the calorific energy of the taking of air that has a temperature $T_{eng}$ significantly higher than the acceptable temperature at which the slat delimitation wall 24 can be exposed without compromising its mechanical integrity.

Figure 5:
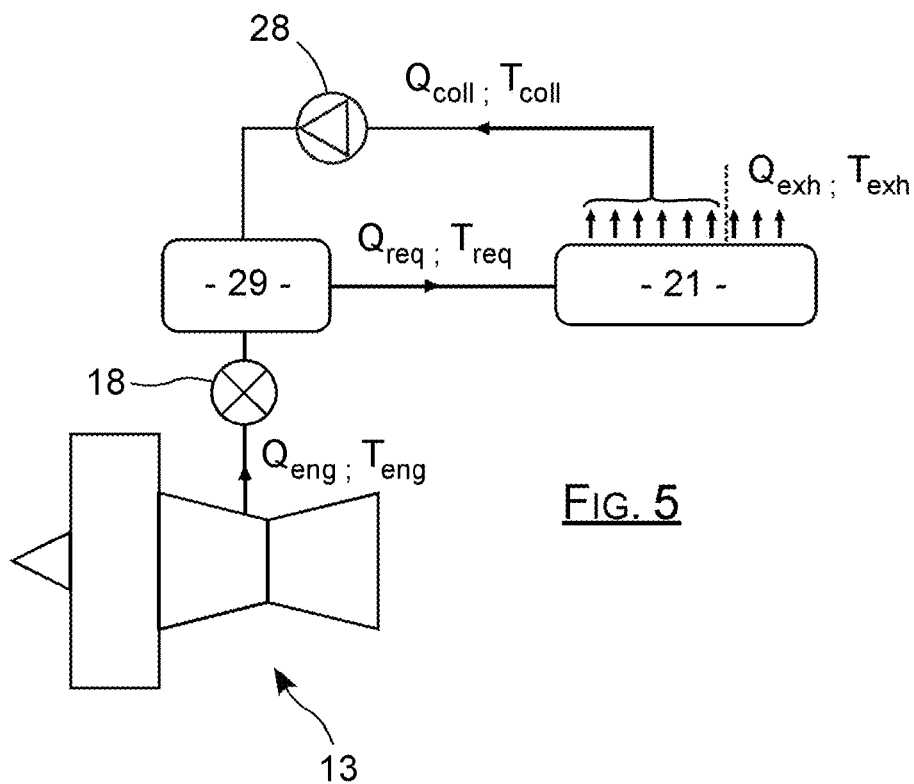
FIG. 5 shows a state diagram that models the quantity and the temperature of the heating air during an anti-icing operation performed with the variant of the invention illustrated on FIG. 3.

In this regard, with reference to the appended FIGS. 3 to 5, the major particularity of the anti-icing system according to the invention lies in the formation of a return loop, allowing reuse of a quantity of so-called collected air $Q_{coll}$, which corresponds to a portion of the quantity of heating air $Q_{req}$ that has been sprayed onto the delimitation wall 24 of the slat after having been conveyed within the injection tube 21. This collection quantity $Q_{coll}$ is conveyed and then reused in the form of a component of the heating air $Q_{req}$, with the quantity of taken air $Q_{eng}$, which circulates in the injection tube 21.

In the example of FIGS. 3 and 4, this function of reintroducing the quantity $Q_{coll}$ of air is provided within the anti-icing system 16 through the association in particular of a capture tube 26, a mixing chamber 29 connected to the capture tube 26, and a pump 28.

Once sprayed against the delimitation wall 24, the quantity $Q_{req}$ leaves the internal chamber 20, located in an upstream zone of the slat 14, being conveyed towards the downstream end of the slat 14 along a leakage path, illustrated by arrows on FIG. 4, which emerges on the external environment. The capture tube is disposed so as to be immersed in this leakage path, and comprises perforations 31 through which the quantity of air $Q_{coll}$ is admitted therein under the action of the pump 28 so as to be conveyed towards the mixing chamber 29 located in the wing 12. The remainder of the heating air, namely the quantity $Q_{req}$ taken away from the quantity $Q_{coll}$ that is admitted into the capture tube, continues its path in order to be exhausted into the external environment. As is understood, this non-reused so-called exhaust quantity $Q_{exh}$, has a temperature $T_{exh}$ the value of which is substantially equivalent to the temperature value of the collection quantity $Q_{coll}$. The perforations 31 are in practice located and oriented according to the flow of the heating quantity $Q_{req}$ along the leakage path at the discharge from the injection tube 21 so as to optimise the potential for capturing the collection quantity $Q_{coll}$.

The pressure observed in the slat 14 being substantially close to the external ambient pressure, because of the existence of the leakage path towards the external environment taken by the exhaust quantity $Q_{exh}$, the pump 28 is adapted for causing a suction effect necessary for conveying the collection quantity $Q_{coll}$ along the capture tube 26. This conveying is in particular provided by means of a telescopic conduit 27 that provides the connection between the mixing chamber 29 and the tube 26 while passing through the leading edge of the wing 12, in a similar manner to the conduit 22 associated with the injection tube 21.

The mixing chamber 29 is located at the interface between the conveying pipe 19 that conveys the quantity $Q_{eng}$ of taking of turbine-engine air 13, and the injection tube 21. In concrete terms, this chamber 29 receives the taken and collection quantities $Q_{eng}$ and $Q_{coll}$, to form therein by mixing the heating quantity $Q_{req}$ that is conveyed towards the injection tube 21.

Resulting from the convective heat transfer between the heating air $Q_{req}$ and the delimitation wall 24 to be heated, the quantity of air $Q_{coll}$ which is collected by the capture tube 26 and conveyed towards the mixing chamber 29 has a temperature $T_{coll}$ below the temperature $T_{req}$ of heating air. As is understood, the target value of the temperature $T_{req}$ of the quantity of heating air $Q_{req}$ can be obtained by means of such a mixing between the quantities of collected air $Q_{coll}$ and of taken air $Q_{eng}$ the associated temperatures $T_{coll}$ and $T_{eng}$ of which are respectively lower than an and higher than the temperature $T_{req}$ required.

The quantity of heating air $Q_{req}$ expressed as the sum of the quantities of collected air $Q_{coll}$ and of taken air $Q_{eng}$, the return loop of the anti-icing system 16 according to the invention thus makes it possible to limit the quantity of air $Q_{eng}$ extracted on the turbine engine 13 compared with a system that has none. As a result, incorporating the anti-icing system 16 according to the invention is non-detrimental with regard to the performances of the turbine engine with which it cooperates. In concrete terms, the system 16 improves the efficiency of the turbine engine with which it cooperates compared with the known system of the prior art identified, in that less air is extracted therefrom.

In addition, given that the quantity of taken air $Q_{eng}$ is captured for heating by mixing the quantity of collected air $Q_{coll}$, it is understood that the anti-icing system 16 according to the invention allows a raw use of the calorific energy taken from the turbine engine 13. In other words, the quantity of taken air $Q_{eng}$ can be fixed on the basis of the precise energy requirement with regard to the temperature $T_{coll}$ of the air collected by means of the return loop.

In this regard, it is in practice a case of establishing the requirements for taking and collecting air according to the operating conditions of the aircraft 11 to ensure that the temperature $T_{req}$ resulting from the mixing tends towards a target value for preventing the appearance of frost on the slat wall 24 in a secure manner with regard to the limit of the constituent materials. In the example in FIGS. 3 and 4, this regulation of the quantities of taken air $Q_{eng}$ and of collected air $Q_{coll}$ is ensured respectively by the actuation of the valve 18 and the operating speed of the pump 28. In practice, the control of the valve 18 and of the pump 28 can be done automatically by a computer according to acquisition data, in particular the temperatures $T_{eng}$ and $T_{coll}$, harvested by measuring instruments that are placed in situ, for example at the capture tube 26, the supply pipe 17 and the slat 14.

The regulation of the quantities of taken air $Q_{eng}$ and of collected air $Q_{coll}$ has been explained, on the basis of FIGS. 3 to 5, as being done actively by the valve 18 and the pump 28. However, the invention is not limited to this particular arrangement and makes it possible to replace the pump 28 by a compressor to cooperate in the same manner with the mixing chamber 29.

Figure 6:
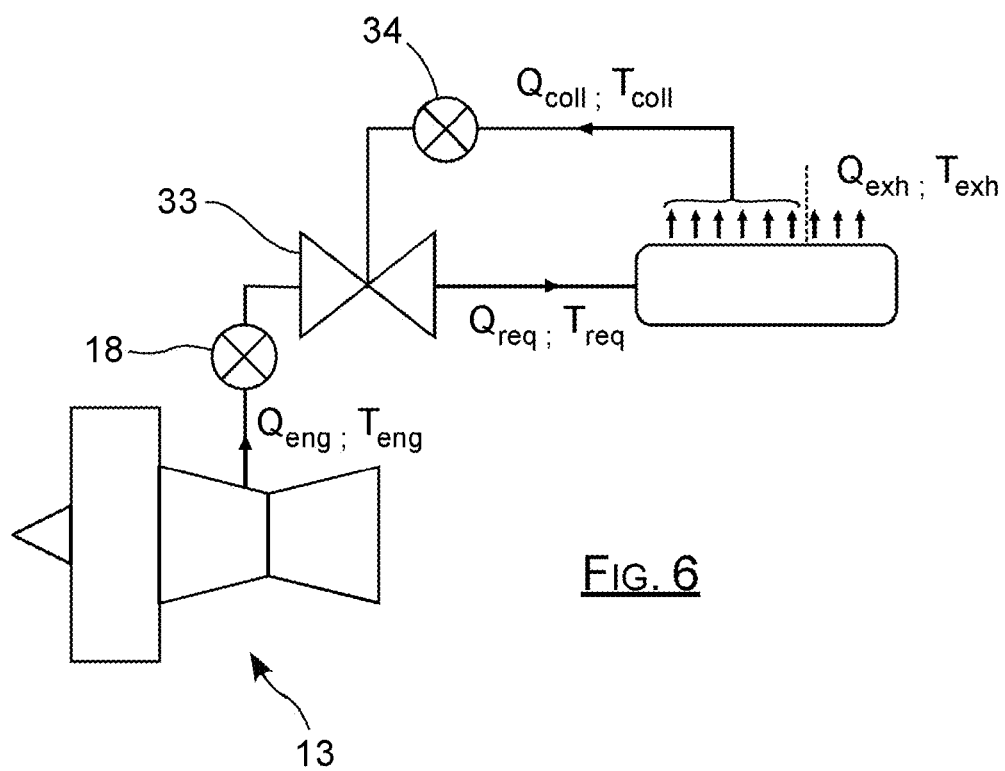
FIG. 6 shows a state diagram according to another variant embodiment of the invention.

With reference to FIG. 6, provision is made as a variant for replacing the mixing chamber 29 and the pump 28 of FIGS. 3 and 5 respectively with a Venturi 33 and a valve 34 for advantageously using the existence of a high pressure at the compressor of the turbine engine 13 in order to create a phenomenon of suction of the quantity of collected air $Q_{coll}$ in the capture tube 26. Such a Venturi 33 is formed by the association of a convergent portion and a divergent portion between which a neck is defined, corresponding to the narrowest zone and to the level from which a negative pressure is observed under the effect of an acceleration of flow at the neck of the Venturi 33. A first end of the Venturi is in communication with the supply pipe 17 to receive the taken quantity $Q_{eng}$, while the other end of this Venturi is in communication with the injection tube 21. The capture tube 26 is in communication with a branch formed at the neck. In this way, the negative pressure formed at this location forces the quantity of collected air $Q_{coll}$ to enter the capture tube 26, which guides it as far as the Venturi, and thus to mix with the quantity of taken air $Q_{eng}$ to supply the injection tube 21 at the outlet with the quantity of heating air $Q_{req}$ resulting from the mixing. In the same way as the valve 18, provided for regulating the taken quantity $Q_{eng}$ on the turbine engine 13, the valve 32 is adapted for regulating the collected quantity $Q_{coll}$ in order to optimise the mixing according to the heating air temperature $T_{req}$ targeted and the temperatures $T_{coll}$ and $T_{eng}$ measured in operation.

At this stage, various arrangements have been described with reference to FIGS. 5 and 6 enabling the anti-icing system 16 to control the content of the taken $Q_{eng}$ and collected $Q_{coll}$ quantities in the mixture according to intrinsic and environment data of the aircraft 11 and of the turbine engine 13. However, the invention is not limited to such a so-called active regulation and, in a variant, makes it possible to tend towards an autoregulation of these quantities, based on a pressure equilibrium. By way of example, the arrangement described in FIG. 6 can be modified by removing the valve 34 and sizing the Venturi 33 on the basis of a predictive model for operating suitably under the most critical conditions encountered in operation of the turbine engine 13, and more globally of the aircraft 11 equipped with such an anti-icing system 16.

In the example in FIGS. 3 and 4, the capture tube 26 is perforated along the extent thereof within the slat 14 at a distance from the injection tube 21. Nevertheless, the invention is not limited to this design particularity of the anti-icing system 16. In practice, abutting the injection 21 and capture 26 tubes to profit from a thermal bridge effect, or disposing the capture tube 26 in the wing 12 while providing means for conveying the collection $Q_{coll}$ quantity towards it, can be envisaged. In the latter case, it can be decided to divide the exhaust quantity $Q_{exh}$ from the collection quantity $Q_{coll}$ at a point retracted from the slat 14.

With reference to the figures, the conveying of the taken $Q_{eng}$ and collected $Q_{coll}$ quantities is provided by tubes. Nevertheless, it is envisaged that the injection and capture tubes 21, 26 be replaced in whole or in part by chambers incorporated at the front and rear of the structure of the slat 24. As is understood, this configuration means that the slat 24 is designed specifically for providing all or part of the conveying of the quantities of air, in particular taken $Q_{eng}$ and collected $Q_{coll}$. In practice, this arrangement makes it possible to form kits each comprising at least one slat 14 forming an integral part of the anti-icing system. In such a case, it is envisaged that the telescopic conduit 22 serves the chamber providing the conveying of the heated quantity $Q_{req}$ in the slat 14. In the same way, the telescopic conduit 27 can be installed directly communicating with the chamber providing the conveying of the heated quantity $Q_{req}$ in the slat 14.

Moreover, in the embodiments described above, the taken quantity $Q_{eng}$ used comes from one or more turbine-engine compressor stages. The highly compressed nature of the air circulating at this compressor advantageously enables it to be conveyed passively as far as the mixing chamber 29 or the Venturi 33, i.e. without requiring the use of a pump, of a jet pipe, or any other device providing energy to the flow to move it. It should be noted however that the use of another hot source for pneumatic supply of the anti-icing system 16 in a taken quantity $Q_{eng}$, both internal and external to the turbine engine 13, is not departing from the scope of the invention provided that the temperature $T_{eng}$ of this taken quantity $Q_{eng}$ is higher than the targeted temperature $T_{req}$ of the quantity of heating air $Q_{req}$ that is sprayed against the slat wall 24 to be heated. By way of non-limitative example, the use of a piston engine or of an auxiliary hot-air generator, which may in particular form an integral part of the anti-icing system 16 or correspond to an onboard system of the aircraft 11, can be adopted without departing from the scope of the invention.

Thus, the return-loop system 16 according to the invention has been described in the context of an anti-icing application of a leading-edge slat 14 of a wing 12. Naturally this application is not limitative. By way of example, the system may be designed to fulfil a simultaneous anti-icing function for a plurality of slats 14 disposed successively along the wing 12, via in particular a plurality of injection-tube sectors 21 connected together fluidically. Moreover, the invention is not specifically limited to the anti-icing of such high-lift devices, and finds its application in the general field of aviation by allowing in concrete terms the use of the system 16 for preventing icing on any surface, lifting, non-working, fixed, movable, etc, of the cell of the aircraft 11 or of a turbine-engine nacelle. In this regard, it is understood that the invention is not limited to presenting an injection tube 21 with a linear structure as illustrated in the example in FIG. 3, and makes it possible to adopt a different morphology that is adapted to the contour of the relevant surface to be heated.

Finally, the system 16 has been described as fulfilling an anti-icing function, namely by maintaining the temperature of the wall 24 at a lower bound that prevents the formation of frost, but this does not entail a limitation to the invention solely to anti-icing. In practice, such a system can also fulfil a de-icing function, namely an elimination of ice now formed on the wall 24 of the slat 14.

Having regard to the above, the system according to the invention can overall be defined as a system for delivering on an aircraft surface a quantity of air heated at a targeted temperature for combating frost, by cooperating with a pneumatic hot source that supplies air at a temperature nevertheless higher than the targeted temperature, by means of which:

means for taking and conveying a quantity of air taken at the pneumatic hot source;

means for capturing and conveying a quantity of collected air corresponding to a portion of the quantity of heating air after spraying of same against the surface to be heated;

mixing means at which the quantity of taken air and the quantity of collected air are conveyed by return loop to form the quantity of heating air; and means for conveying and spraying the quantity of heating air against the aircraft surface to be heated.

The invention claimed is:

1. A system for protecting a surface of an aircraft against frost by spraying a quantity of heating air against said surface to heat said surface, the quantity of heating air requiring to have a temperature both higher than a threshold value for which the function of protection against frost is provided, and below a maximum acceptable value for the materials constituting the surface, the system comprising:—means for taking a quantity of taken air—at a pneumatic hot source and conveying the quantity of taken air, the quantity of taken air having a temperature higher than the maximum acceptable temperature;—means for capturing and conveying a quantity of collected air corresponding to a portion of the quantity of heating air after spraying of same against the surface to be heated, the quantity of collected air having a temperature below the acceptable temperature;—mixing means that regulate the quantities of collected and taken air to form, by mixing these two quantities, the quantity of heating air at the acceptable temperature;—means for conveying towards and spraying the quantity of heating air against the aircraft surface to be heated.

2. The system for protecting a surface of an aircraft against frost according to claim 1, the aircraft being driven by means of at least one turbine engine comprising a compressor stage that corresponds to the pneumatic hot source, wherein the means for taking and conveying the quantity of taken air include a supply pipe that conveys the quantity of taken air.

3. The system for protecting against frost according to claim 1, wherein the surface to be heated is a surface delimiting a leading-edge flap equipped to a wing of the aircraft, wherein:—the means for conveying to and spraying the quantity of heating air against the surface include an injection tube in which the quantity of heating air circulates, the injection tube extending within the flap facing the surface and comprising perforations through which the quantity of heating air is sprayed out of the injection tube against the surface; and—the means for capturing and conveying the quantity of collected air include a capture tube.

4. The system for protecting against frost according to claim 1, wherein:
the surface to be heated is a surface delimiting a leading-edge flap equipped to a wing of the aircraft;
the leading-edge flap includes a first internal chamber, delimited by the delimitation surface wherein the quantity of heating air circulates as means for conveying towards and spraying the quantity of heating air against the surface;
the leading-edge flap includes a second internal chamber, as means for capturing and conveying the quantity of collected air.

5. The system for protecting against frost according to claim 3, wherein the capture tube extends within the flap and comprises perforations through which the quantity of collected air is admitted into the capture tube.

6. The system for protecting against frost according to claim 3, wherein the mixing means include:—a mixing chamber in which the quantities of collected and taken air are conveyed;—a control valve that regulates the passage of the quantity of taken air in a supply pipe;—a pump or a compressor that controls the quantity of collected air admitted into the capture tube.

7. The system for protecting against frost according to claim 2, wherein the mixing means include a Venturi that delimits a throttling neck, a first end of the Venturi being in communication with the supply pipe to receive the taken quantity; a capture tube being in communication with a branch formed at the throttling neck to convey the collected quantity in the Venturi; a second end of the Venturi being in communication with an injection tube to supply the injection tube with a quantity of heating air.

8. An aircraft comprising a system according to claim 1 for protecting one of the aircraft surfaces against frost.

* * * * *